United States Patent
Rahman et al.

(10) Patent No.: US 9,712,005 B2
(45) Date of Patent: Jul. 18, 2017

(54) INTERIOR PERMANENT MAGNET MACHINE WITH POLE-TO-POLE ASYMMETRY OF ROTOR SLOT PLACEMENT

(71) Applicant: GM GLOBAL TECHNOLOGY OPERATIONS LLC, Detroit, MI (US)

(72) Inventors: Khwaja M. Rahman, Troy, MI (US); Sinisa Jurkovic, Sterling Heights, MI (US); Edward L. Kaiser, Orion, MI (US); Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 437 days.

(21) Appl. No.: 14/557,510

(22) Filed: Dec. 2, 2014

(65) Prior Publication Data

US 2015/0084452 A1    Mar. 26, 2015

Related U.S. Application Data

(62) Division of application No. 13/315,856, filed on Dec. 9, 2011, now Pat. No. 8,933,606.

(51) Int. Cl.
*H02K 1/27* (2006.01)
*H02K 21/14* (2006.01)

(52) U.S. Cl.
CPC ......... *H02K 1/2706* (2013.01); *H02K 1/2766* (2013.01)

(58) Field of Classification Search
CPC .......... H02K 1/27; H02K 1/272; H02K 1/274; H02K 1/2753; H02K 1/276; H02K 1/2766; H02K 21/12; H02K 21/14; H02K 2201/06

See application file for complete search history.

(56) References Cited

U.S. PATENT DOCUMENTS

| | | | | |
|---|---|---|---|---|
| 3,840,763 A | * | 10/1974 | Baumann | H02K 1/2766 310/156.56 |
| 8,933,606 B2 | * | 1/2015 | Rahman | H02K 1/2766 310/156.53 |
| 2003/0030343 A1 | * | 2/2003 | Naito | H02K 1/278 310/156.56 |
| 2008/0007131 A1 | * | 1/2008 | Cai | H02K 1/2766 310/156.38 |
| 2011/0198959 A1 | * | 8/2011 | Vyas | H02K 1/2766 310/156.21 |

* cited by examiner

*Primary Examiner* — Michael Andrews
(74) *Attorney, Agent, or Firm* — Quinn IP Law

(57) ABSTRACT

An interior permanent magnet machine includes a rotor having a plurality of slots. First and second slots are disposed in a first pole and the third and fourth slots are disposed in a second pole. A first angle is defined between respective centerlines of the first and second slots. A second angle is defined between respective centerlines of the third and fourth slots. The first angle is configured to be sufficiently different from the second angle so that torque ripple is reduced. Thus the rotor is configured such that the angular configuration of slots in a first pole is different from the angular configuration of slots in a second pole of the rotor.

14 Claims, 3 Drawing Sheets

INTERIOR PERMANENT MAGNET MACHINE WITH POLE-TO-POLE ASYMMETRY OF ROTOR SLOT PLACEMENT

CROSS REFERENCE TO RELATED APPLICATIONS

This application is a divisional of U.S. application Ser. No. 13/315,856, filed Dec. 9, 2011, which is hereby incorporated by reference in its entirety.

TECHNICAL FIELD

The present invention relates generally to an interior permanent magnet machine, and more particularly, to the configuration of rotor slots or barriers in the interior permanent magnet machine.

BACKGROUND

An interior permanent magnet machine generally includes a rotor having a plurality of magnets of alternating polarity around the outer periphery of the rotor. The rotor is rotatable within a stator which generally includes a plurality of windings and magnetic poles of alternating polarity. Permanent magnet machines may produce undesirable torque ripple, resulting in unwanted vibration and noise. Traditionally, the magnets in the rotor are skewed to reduce torque ripple, for example, by placing the magnets at an axial angle relative to one another or rotating the magnets in steps. Sometimes the stator is skewed to achieve the same. However, skewing may make manufacturing more complicated. Traditionally, the rotor slot configuration in interior permanent magnet machines is the same from one pole to another.

SUMMARY

An interior permanent magnet machine includes a rotor having a plurality of slots and poles. First and second slots are disposed in a first pole and third and fourth slots are disposed in a second pole. A first barrier is defined by the first, second, third and fourth slots. The slots are configured to be symmetric relative to their respective pole axes. A first angle is defined between the first and second slots. A second angle is defined between the third and fourth slots. The first angle is configured to be sufficiently different from the second angle so that torque ripple is minimized. The torque pulsation created by one pole may be reduced by the counter torque pulsation created by the other pole, thereby minimizing torque ripple. Thus the rotor is configured such that the angular configuration of slots in a first pole is different from the angular configuration of slots in a second pole of the rotor.

Each of the plurality of slots defines a respective centerline. The first angle may be defined between the respective centerlines of the first and second slots. The second angle may be defined between respective centerlines of the third and fourth slots.

In one embodiment, the plurality of slots may include fifth, sixth, seventh and eighth slots that define a second barrier (which may be radially outwards or inwards to the first barrier). The fifth and sixth slots may be disposed in the first pole and the seventh and eighth slots may be disposed in the second pole. A third angle may be defined between the fifth and sixth slots. A fourth angle may be defined between the seventh and eighth slots such that each of the first, second, third and fourth angles are different from one another.

The first, second, third, fourth, fifth, sixth, seventh and eighth slots may be substantially arc-shaped. The second barrier in the first and second poles may define respective first and second edges. A first span angle may be defined by the first edges of the second barrier in the first pole. A second span angle may be defined by the second edges of the second barrier in the second pole such that the second span angle is different from the second span angle.

In another embodiment, the plurality of slots may include ninth, tenth, eleventh and twelfth slots, the ninth and tenth slots being disposed in the first pole and the eleventh and twelfth slots being disposed in the second pole.

The above features and advantages and other features and advantages of the present invention are readily apparent from the following detailed description of the best modes for carrying out the invention when taken in connection with the accompanying drawings.

DETAILED DESCRIPTION

Figure 1:
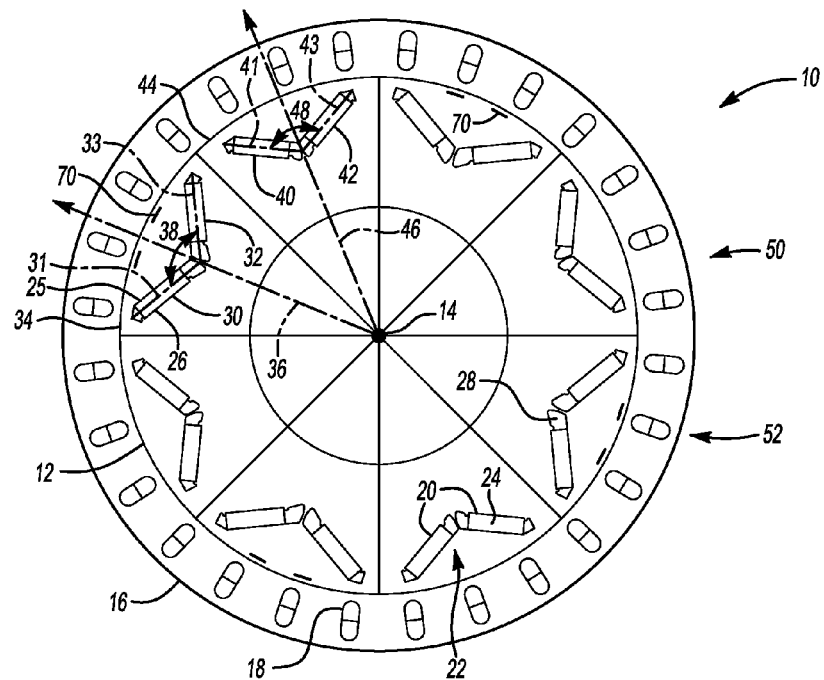
FIG. 1 is a schematic cross-sectional view of an interior permanent magnet machine, in accordance with a first embodiment of the present disclosure.

Referring to the Figures, wherein like reference numbers refer to the same or similar components throughout the several views, FIG. 1 is a schematic cross-sectional view of a single-barrier interior permanent magnet machine 10. The machine 10 includes a rotor 12 having an origin 14. The rotor 12 is rotatable within a generally annular stator 16 having a plurality of windings 18. The rotor 12 includes a plurality of slots 20 that extend into the rotor 12 and define a three-dimensional volume having any suitable shape. A barrier 22 is defined by the plurality of slots 20. The rotor 12 may be formed with any number of slots 20. All or a portion of the slots 20 may be filled with permanent magnets 24. The rotor 12 may include air pockets 28 incorporated into the structure at various locations.

Referring to FIG. 1, first and second slots 30, 32 are provided in a first pole 34. The rotor may include any number of poles, each of which is defined by a centrally-located respective pole axis. The first and second slots 30, 32 are configured to be symmetric relative to a first pole axis 36. A first angle 38 is defined between respective centerlines 31, 33 of the first and second slots 30, 32. The first angle 38 may also be defined between the respective outer or inner sides 25, 26 of the first and second slots 30, 32. This applies to each of the angles described below. Referring to FIG. 1, third and fourth slots 40, 42 are provided in a second pole 44 and configured to be symmetric relative to a second pole axis 46. A second angle 48 is defined between respective centerlines 41, 43 of the third and fourth slots 40, 42. The first pole 34 may or may not be adjacent to the second pole 44.

The rotor 12 is configured such that the angular configuration or position of slots 20 in the first pole 34 is different from the angular configuration or position of slots 20 in the second pole 44. The first angle 38 is configured to be sufficiently different from the second angle 48 so that torque ripple is minimized. In one example, the first angle 38 is 120 degrees and the second angle 48 is 136 degrees. The angular configuration may be different for every pole of the rotor 12 or it may be repeated at every "n" number of poles, where n is 2 to P, P being the total number of poles. For example, a rotor 12 with eight poles may have eight different angular configurations or it may have four different configurations for adjacent poles that is repeated for the remaining four poles. The rotor 12 may be configured such that a first half 50 is symmetric with respect to a second half 52.

Figure 2:
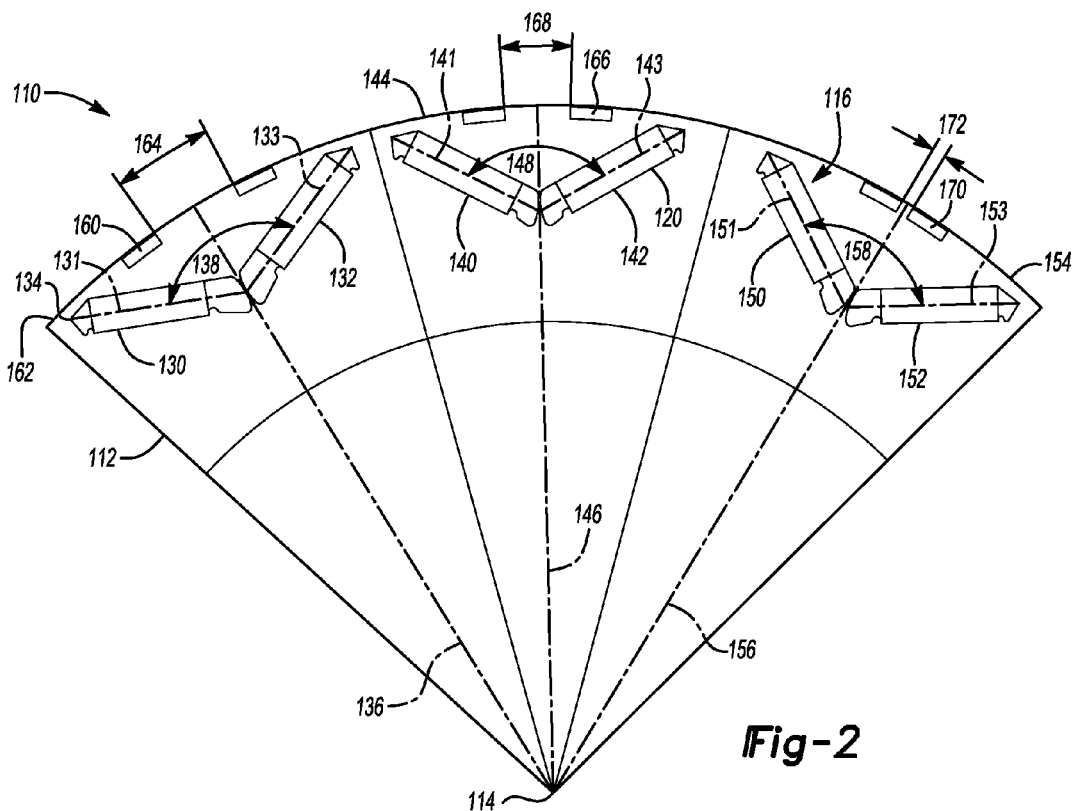
FIG. 2 is a schematic fragmentary cross-sectional view of an interior permanent magnet machine, in accordance with a second embodiment.

Referring to FIG. 2, a second embodiment illustrated by a single-barrier interior permanent magnet machine 110 is shown. The machine 110 includes a rotor 112 having an origin 114. The rotor 112 is rotatable within a generally annular stator (not shown). The rotor includes a barrier 116 formed by a plurality of slots 120 that extend into the rotor 112 and define a three-dimensional volume having any suitable shape.

Referring to FIG. 2, first and second slots 130, 132 are provided in a first pole 134. The rotor may include any number of poles, each of which is defined by a respective pole axis. The first and second slots 130, 132 are configured to be symmetric relative to a first pole axis 136. A first angle 138 is defined between respective centerlines 131, 133 of the first and second slots 130, 132.

Referring to FIG. 2, third and fourth slots 140, 142 are provided in a second pole 144 and configured to be symmetric relative to a second pole axis 146. A second angle 148 is defined between respective centerlines 141, 143 of the third and fourth slots 140, 142. Referring to FIG. 2, fifth and sixth slots 150, 152 are provided in a third pole 154 and configured to be symmetric relative to a third pole axis 156. A third angle 158 is defined between respective centerlines 151, 153 of the fifth and sixth slots 150, 152.

Referring to FIG. 2, the rotor 112 is configured such that the first, second and third angles 138, 148 and 158 are each different from one another. In one example, the first angle 138 is 123 degrees, the second angle 148 is 137 degrees and the third angle 158 is 120 degrees. The three-pole pattern represented by the first, second and third poles 134, 144, 154 may be repeated for the rest (not shown) of the rotor 112.

Referring to FIG. 2, optionally, a first pair of outer slots 160 may be formed near the outer surface 162 of the rotor 112 at the first pole 134. The first pair of outer slots 160 may be separated by a first spacing 164 and configured to be symmetric relative to the first pole axis 136. In one example, the first pair of outer slots 160 are formed approximately 0.5 mm from the outer surface 162 of the rotor. A second pair of outer slots 166 may be formed near the outer surface 162 of the rotor 112 at the second pole 144. The second pair of outer slots 166 may be separated by a second spacing 168 and configured to be symmetric relative to the second pole axis 146. A third pair of outer slots 170 may be formed near the outer surface 162 of the rotor 112 at the third pole 154. The third pair of outer slots 170 may be separated by a third spacing 172 and configured to be symmetric relative to the third pole axis 156.

The rotor 112 may be configured such that the first, second and third spacing 164, 168, 172 are each different from one another. In one example, the first, second and third spacing 164, 168, 172 are 11.9 mm, 8.4 mm and 11.3 mm, respectively. The spacing configuration or pattern shown by the first, second and third poles 134, 144, 154 may be repeated for the rest (not shown) of the rotor 112. Referring to FIG. 1, alternatively, outer slots 70 may also be formed at every alternate one of the poles. The angles 138, 148 and 158 and spacing 164, 168, 172 described above may be optimized to obtain the desired level of averaging for the respective rotors 12 and 112. This optimization may be performed empirically or through conventional computer modeling methods known in the art.

Figure 3:
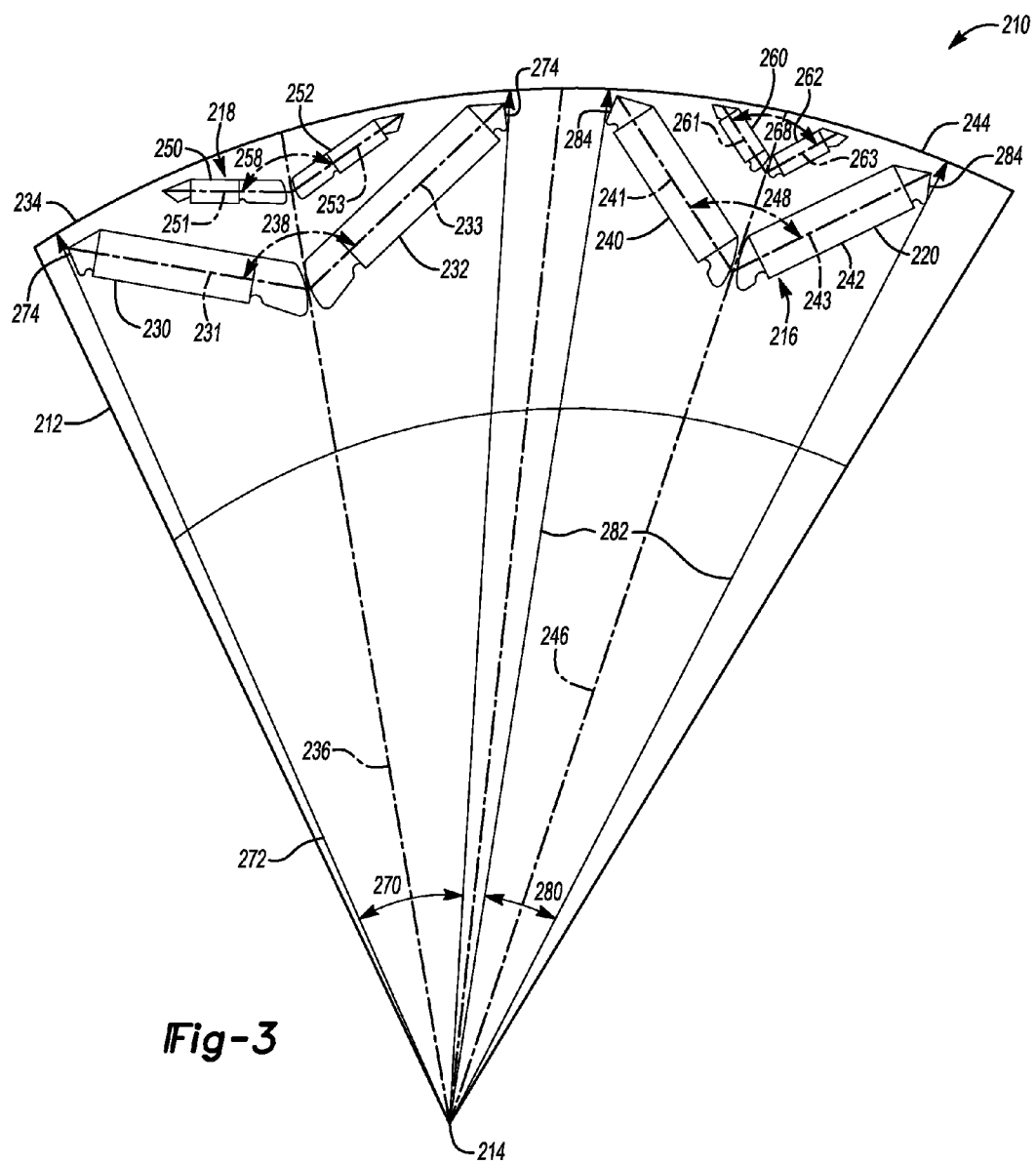
FIG. 3 is a schematic fragmentary cross-sectional view of an interior permanent magnet machine, in accordance with a third embodiment.

FIG. 3 illustrates a schematic fragmentary cross-sectional view of a third embodiment of an interior permanent magnet machine 210. The machine 210 includes a rotor 212 having an origin 214. The rotor 212 is rotatable within a generally annular stator (not shown). A plurality of slots 220 extend into the rotor 212 and define an outer barrier 216 and an inner barrier 218. The rotor 212 may be formed with any number of slots for each of the outer and inner barriers 216, 218 in each pole. The shape of each slot 220 may be substantially rectangular, as shown in FIG. 3.

Referring to FIG. 3, the inner barrier 216 includes first and second slots 230, 232 disposed in a first pole 234 and configured to be symmetric relative to a first pole axis 236. A first angle 238 is defined between the respective centerlines 231, 233 of first and second slots 230, 232. Referring to FIG. 3, the inner barrier 216 includes third and fourth slots 240, 242 disposed in a second pole 244 and configured to be symmetric relative to a second pole axis 246. A second angle 248 is defined between the respective centerlines 241, 243 of the third and fourth slots 240, 242.

Referring to FIG. 3, the outer barrier 218 includes fifth and sixth slots 250, 252 disposed in the first pole 234 and configured to be symmetric relative to the first pole axis 236. A third angle 258 is defined between the respective centerlines 251, 253 of the fifth and sixth slots 250, 252. Referring to FIG. 3, the outer barrier 218 includes seventh and eighth slots 260, 262 disposed in the second pole 244 and configured to be symmetric relative to the second pole axis 246. A fourth angle 268 is defined between the respective centerlines 261, 263 of the seventh and eighth slots 260, 262.

Referring to FIG. 3, the rotor 212 is configured such that the first to the fourth angles 238, 248, 258, 268 are each different from one another. In one example, the first to the fourth angles 238, 248, 258, 268 are 126.3, 103.6, 145.7 and 100.3 degrees, respectively. The two-pole pattern represented by the first and second poles 234, 244 may be repeated for the rest (not shown) of the rotor 212.

Referring to FIG. 3, a span angle is defined by the widest barrier in each pole. A first span angle 270 extends between first edge lines 272 that originate from the origin 214 and are tangential to the first edges 274 (also referred to as outermost circumferential points 274) of the inner barrier 216 in the first pole 234. A second span angle 280 extends between second edge lines 282 that originate from the origin 214 and are tangential to the second edges 284 (also referred to as outermost circumferential points 284) of the inner barrier 216 in the second pole 244. The second span angle 280 is configured to be different from the first span angle 270. A span angle for the outer barrier 218 may also be similarly defined.

Figure 4:
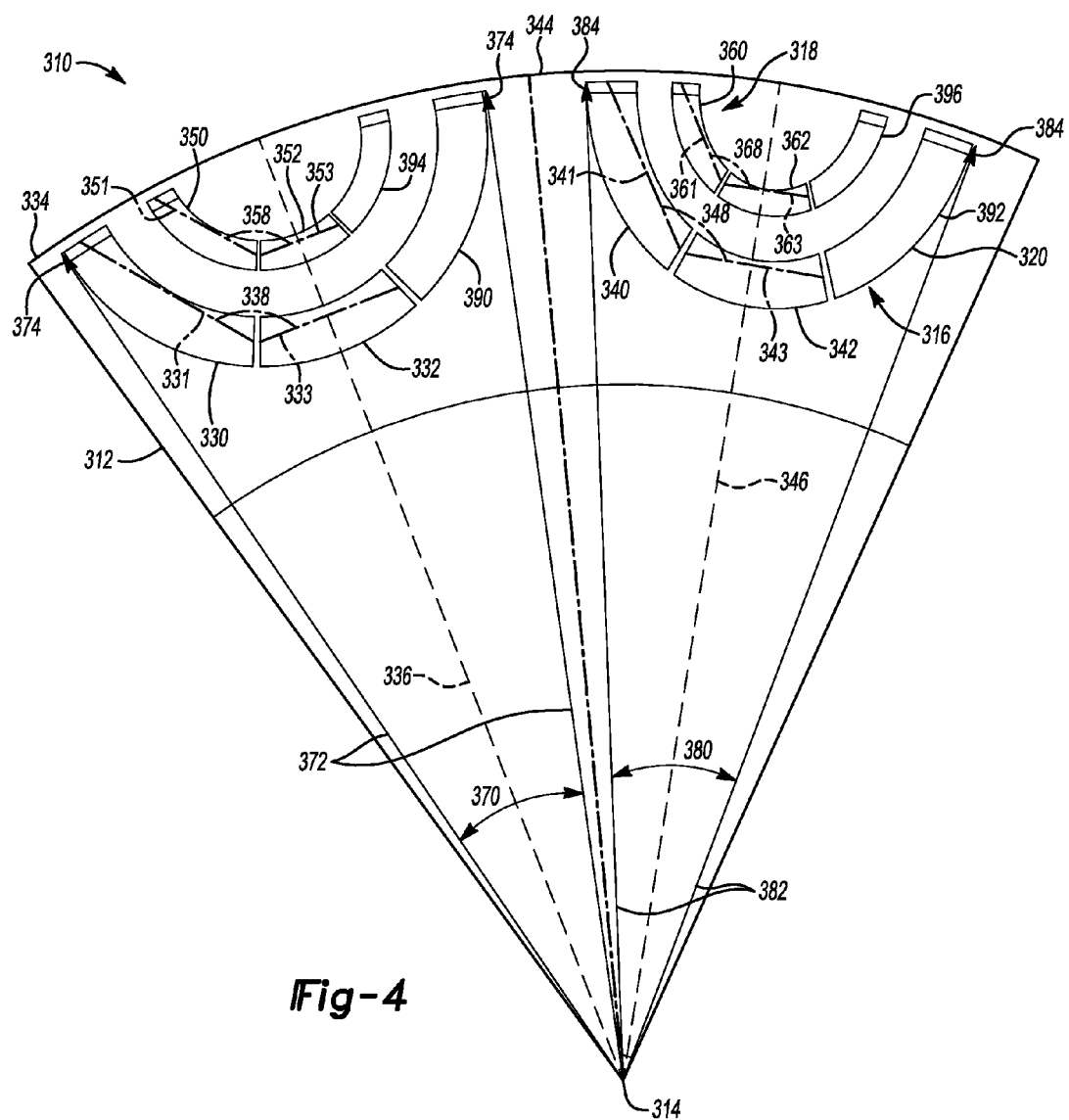
FIG. 4 is a schematic fragmentary cross-sectional view of an interior permanent magnet machine, in accordance with a fourth embodiment.

FIG. 4 illustrates a schematic fragmentary cross-sectional view of a fourth embodiment of an interior permanent magnet machine 310. The machine 310 includes a rotor 312 having an origin 314. The rotor 312 is rotatable within a generally annular stator (not shown). A plurality of slots 320 extend into the rotor 312 and define an outer barrier 316 and an inner barrier 318. Referring to FIG. 4, the slots 320 may be substantially arc-shaped. For example, each slot 320 may have a cross-sectional shape as an arc segment belonging to a different circle.

Referring to FIG. 4, the inner barrier 316 includes first and second slots 330, 332 disposed in a first pole 334. A first angle 338 is defined between the respective centerlines 331, 333 of the first and second slots 330, 332. Referring to FIG. 3, the inner barrier 316 includes third and fourth slots 340, 342 disposed in a second pole 344. A second angle 348 is defined between the respective centerlines 341, 343 the third and fourth slots 340, 342.

Referring to FIG. 4, the outer barrier 318 includes fifth and sixth slots 350, 352 disposed in the first pole 334. A third angle 358 is defined between the respective centerlines 351, 353 of the fifth and sixth slots 350, 352. Referring to FIG. 4, the outer barrier 318 includes seventh and eighth slots 360, 362 disposed in the second pole 344. A fourth angle 368 is defined between the respective centerlines 361, 363 of the seventh and eighth slots 360, 362. Second slot 332 and sixth slot 352 may be configured to be symmetric relative to a first pole axis 336. Fourth slot 342 and eighth slot 362 may be configured to be symmetric relative to a second pole axis 346.

Referring to FIG. 4, the rotor 312 is configured such that the first through fourth angles 338, 348, 358, 368 are each different from one another. In one example, the first through fourth angles 338, 348, 358, 368 are 128, 104, 122 and 110 degrees, respectively. The two-pole pattern represented by the first and second poles 334, 344 may be repeated for the rest (not shown) of the rotor 312. The rotor 12 may include ninth and tenth slots 390, 394 disposed in the first pole 334 and eleventh and twelfth slots 392, 396 disposed in the second pole 344. First and fifth slots 330, 350 may be configured to be symmetric relative to the ninth and tenth slots 390, 394, respectively. Third and seventh slots 340, 360 may be configured to be symmetric relative to the eleventh and twelfth slots 392, 396, respectively.

Referring to FIG. 4, a span angle is defined by the widest barrier in each pole. A first span angle 370 extends between first edge lines 372 that originate from the origin 314 and are tangential to the first edges 374 (also referred to as outermost circumferential points 374) of the inner barrier 316 in the first pole 334. A second span angle 380 extends between second edge lines 382 that originate from the origin 314 and are tangential to the second edges 384 (also referred to as outermost circumferential points 384) of the inner barrier 316 in the second pole 344. The second span angle 380 is configured to be different from the first span angle 370. A span angle for the outer barrier 318 may also be similarly defined.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An interior permanent magnet machine comprising:
a rotor having a center and a plurality of slots, the rotor being configured to magnetically interact with a stator;
a first and a second pole having centrally-located first and second pole axes in the rotor, respectively;
wherein the plurality of slots includes first, second, third and fourth slots, the first and second slots being disposed in the first pole and the third and fourth slots being disposed in the second pole;
wherein the first, second, third and fourth slots are substantially arc-shaped; a first barrier defined by the first, second, third and fourth slots;
a first angle defined between respective centerlines of the first and second slots, and a second angle defined between respective centerlines of the third and fourth slots; and
wherein the first angle is sufficiently different from the second angle to reduce torque ripple.

2. The machine of claim 1:
wherein the plurality of slots includes fifth, sixth, seventh and eighth slots, the fifth and sixth slots being disposed in the first pole and the seventh and eighth slots being disposed in the second pole;
a second barrier defined by the fifth, sixth, seventh and eighth slots; and
a third angle defined between respective centerlines of the fifth and sixth slots and a fourth angle defined between respective centerlines of the seventh and eighth slots, each of the first, second, third and fourth angles being different from one another.

3. The machine of claim 2, wherein the second barrier in the first and second poles defines respective outermost circumferential points; and further comprising:
a first span angle defined between first edge lines connecting the center of the rotor and the respective outermost circumferential points of the second barrier in the first pole;
a second span angle defined between second edge lines connecting the center of the rotor and the respective outermost circumferential points of the second barrier in the second pole, the second span angle being different from the first span angle.

4. The machine of claim 2, wherein the second and sixth slots are each symmetric relative to the first pole axis.

5. The machine of claim 2, wherein the fourth and eighth slots are each symmetric relative to the second pole axis.

6. The machine of claim 2, wherein the fifth, sixth, seventh and eighth slots are substantially arc-shaped.

7. The machine of claim 2, wherein the plurality of slots includes ninth, tenth, eleventh and twelfth slots, the ninth and tenth slots being disposed in the first pole and the eleventh and twelfth slots being disposed in the second pole.

8. The machine of claim 7:
wherein the first slot is positioned symmetrically across from the ninth slot, relative to the first pole axis; and
wherein the fifth slot is positioned symmetrically across from the tenth slot, relative to the first pole axis.

9. The machine of claim 7:
wherein the third slot is positioned symmetrically across from the eleventh slot, relative to the first pole axis; and
wherein the seventh slot is positioned symmetrically across from the twelfth slot, relative to the second pole axis.

10. An interior permanent magnet machine comprising:
a rotor having a center and a plurality of slots, the rotor being configured to magnetically interact with a stator;
a first and a second pole having centrally-located first and second pole axes in the rotor, respectively;
wherein the plurality of slots includes first, second, third and fourth slots, the first and second slots being disposed in the first pole and the third and fourth slots being disposed in the second pole;
a first barrier defined by the first, second, third and fourth slots;

wherein the plurality of slots includes fifth, sixth, seventh and eighth slots, the fifth and sixth slots being disposed in the first pole and the seventh and eighth slots being disposed in the second pole;

a second barrier defined by the fifth, sixth, seventh and eighth slots;

wherein the first, second, third, fourth, fifth, sixth, seventh and eighth slots are substantially arc-shaped;

a first angle defined between respective centerlines of the first and second slots and a second angle defined between respective centerlines of the third and fourth slots;

a third angle defined between respective centerlines of the fifth and sixth slots and a fourth angle defined between respective centerlines of the seventh and eighth slots;

wherein each of the first, second, third and fourth angles are different from one another.

11. The machine of claim 10, wherein the second barrier in the first and second poles defines respective outermost circumferential points; and further comprising:

a first span angle defined between first edge lines connecting the center of the rotor and the respective outermost circumferential points of the second barrier in the first pole;

a second span angle defined between second edge lines connecting the center of the rotor and the respective outermost circumferential points of the second barrier in the second pole, the second span angle being different from the first span angle.

12. The machine of claim 10, wherein the plurality of slots includes ninth, tenth, eleventh and twelfth slots, the ninth and tenth slots being disposed in the first pole and the eleventh and twelfth slots being disposed in the second pole.

13. The machine of claim 10, wherein the ninth, tenth, eleventh and twelfth slots are substantially arc-shaped.

14. An interior permanent magnet machine comprising:

a rotor having a center and a plurality of slots, the rotor being configured to magnetically interact with a stator;

a first and a second pole having centrally-located first and second pole axes in the rotor, respectively;

wherein the plurality of slots includes first, second, third and fourth slots, the first and second slots being disposed in the first pole and the third and fourth slots being disposed in the second pole;

a first barrier defined by the first, second, third and fourth slots;

wherein the plurality of slots includes fifth, sixth, seventh and eighth slots, the fifth and sixth slots being disposed in the first pole and the seventh and eighth slots being disposed in the second pole;

a second barrier defined by the fifth, sixth, seventh and eighth slots;

wherein the first, second, third, fourth, fifth, sixth, seventh and eighth slots are substantially arc-shaped;

a first angle defined between respective centerlines of the first and second slots and a second angle defined between respective centerlines of the third and fourth slots;

a third angle defined between respective centerlines of the fifth and sixth slots and a fourth angle defined between respective centerlines of the seventh and eighth slots;

wherein each of the first, second, third and fourth angles are different from one another;

wherein the plurality of slots further includes ninth, tenth, eleventh and twelfth slots, the ninth and tenth slots being disposed in the first pole and the eleventh and twelfth slots being disposed in the second pole;

wherein the first, second, third, fourth, fifth, sixth, seventh and eighth slots are substantially arc-shaped;

wherein the second barrier in the first and second poles defines respective outermost circumferential points; and further comprising:

a first span angle defined between first edge lines connecting the center of the rotor and the respective outermost circumferential points of the second barrier in the first pole;

a second span angle defined between second edge lines connecting the center of the rotor and the respective outermost circumferential points of the second barrier in the second pole, the second span angle being different from the first span angle.

\* \* \* \* \*